UNITED STATES PATENT OFFICE.

CASPAR SCHNEIDER, OF STAPLETON, NEW YORK.

INSECTICIDE SOLUTION.

SPECIFICATION forming part of Letters Patent No. 421,196, dated February 11, 1890.

Application filed June 6, 1889. Serial No. 313,383. (No specimens.)

*To all whom it may concern:*

Be it known that I, CASPAR SCHNEIDER, a citizen of the United States, residing at Stapleton, in the county of Richmond and State of New York, have invented new and useful Improvements in Insecticide Compounds, of which the following is a specification.

The nature of my invention consists in a compound for destroying potato-bugs and other insects on growing plants.

In carrying out my invention I take about one hundred pounds of arsenious acid and about sixty-two and one-half pounds of aqua-ammonia of about 20° Baumé, and after having heated the arsenious acid to about 260° Fahrenheit I add the aqua-ammonia in a lukewarm state and stir the mixture until the arsenious acid has intimately mingled with the aqua-ammonia. I then allow the mixture to cool and let it remain for two days before using. During that time the mixture must be stirred several times each day, and when the liquid is drawn off at the end of the second day a sediment is left in the cask or vessel, which can be heated again and mixed with an additional quantity of ammonia-water.

The clear liquid obtained as above stated contains acid ammonium arsenite and free arsenious acid dissolved in the ammonium-arsenite solution in the proportion of about twelve parts of the arsenite to four parts of the arsenious acid.

In order to render the fluid adhesive, so that it will adhere to the plants, I can mix it with an adhesive substance, such as gum-arabic. A good result is obtained by adding about two pounds of gum-arabic to forty-five gallons of the solution. The adhesive, however, is not indispensable.

From the foregoing description it will be seen that my composition is a solution containing at least fifteen per cent. of arsenious acid, so that it must be considerably diluted with water before it is fit to be applied to the plants. I have found that one tablespoonful of my composition poured into a pailful of water produces a solution of sufficient strength to kill potato-bugs when it is applied to the plants in the form of a spray.

Two quarts of my composition are sufficient for five acres of potato-plants. For this reason the cost of transportation of my composition is comparatively small and the article can be sold with advantage throughout the whole country.

The advantage of my composition over paris-green will be easily seen. My composition, when applied to plants in the proper degree of dilution, produces no injury to the plants. It does not surcharge the ground with arsenic, and it is not liable to be blown away by the wind.

What I claim as new, and desire to secure by Letters Patent, is—

The herein-described composition of matter to be used as an insecticide, said composition consisting of an aqueous solution of acid ammonium arsenite and free arsenious acid dissolved in the acid ammonium-arsenite solution in about the proportion herein specified.

In testimony whereof I have hereunto set my hand in the presence of two subscribing witnesses.

CASPAR SCHNEIDER.

Witnesses:
J. VAN SANTVOORD,
W. HAUFF.